May 14, 1957 W. M. SHANHOUSE ET AL 2,792,566
LIQUID LEVEL DETECTOR
Filed Dec. 11, 1953
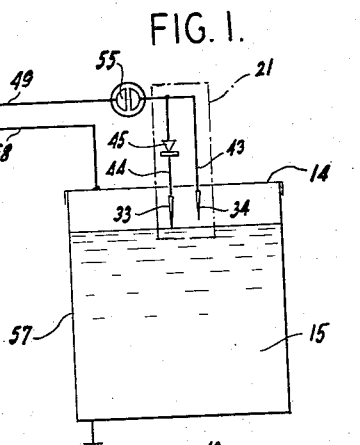
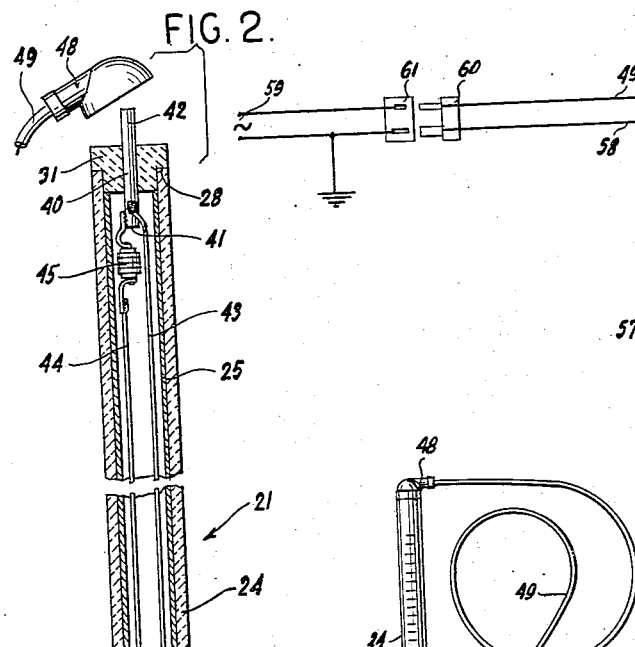
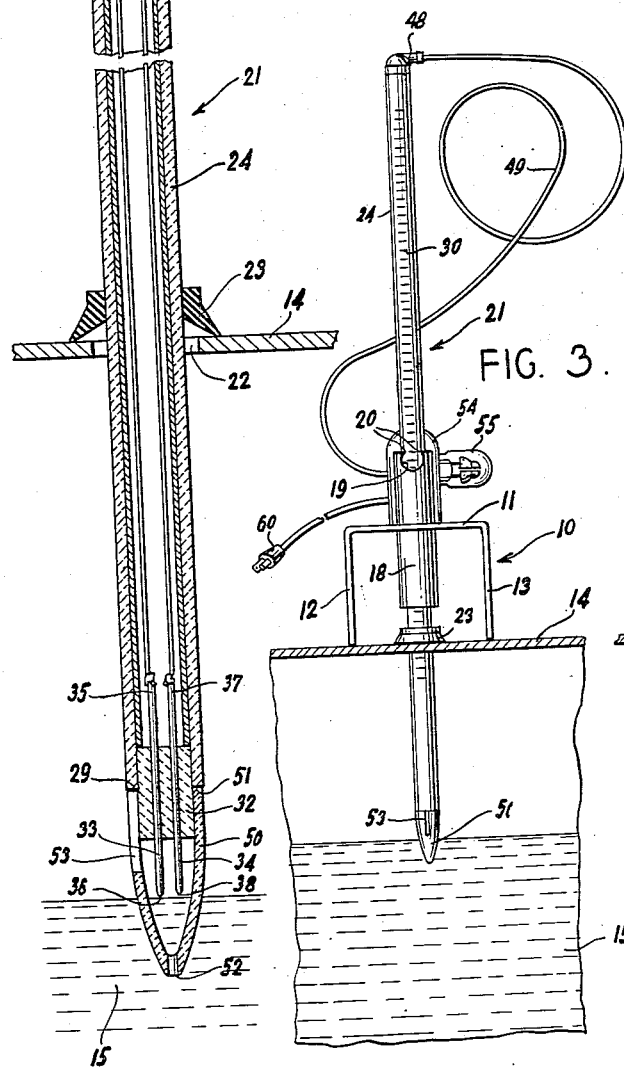
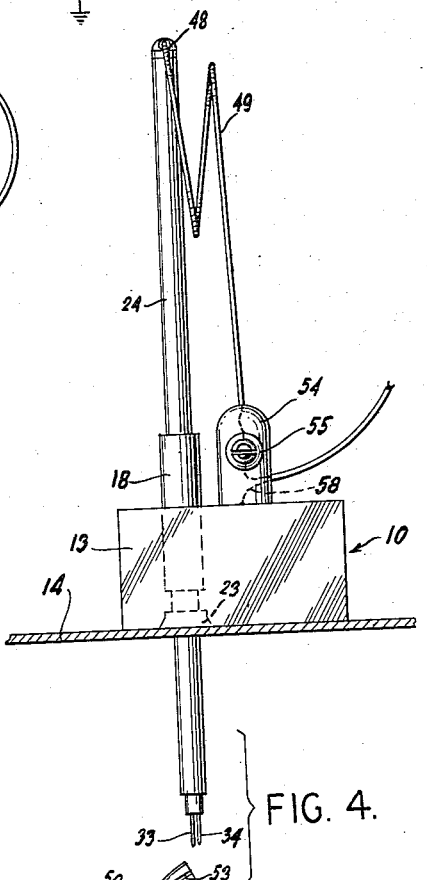
INVENTORS.
WILLIAM M. SHANHOUSE AND
ERNEST DAHER
BY Mock & Blum
ATTORNEYS United States Patent Office 2,792,566
Patented May 14, 1957

2,792,566

LIQUID LEVEL DETECTOR

William M. Shanhouse, Roslyn Heights, and
Ernest Daher, Babylon, N. Y.

Application December 11, 1953, Serial No. 397,586

6 Claims. (Cl. 340—244)

This invention relates generally to detecting devices, and is particularly directed to devices for detecting the level of a liquid surface.

The particular embodiment of the present invention, which is illustrated in the drawings and which will be described hereinafter in greater detail, comprises generally, at least, one electrode adapted to close an electrical circuit upon contact with a liquid surface, and a signal for indicating closure of the electrical circuit.

It is a general object of the present invention to provide a simple and efficient means for detecting the level of a liquid surface, and for indicating when the surface of a liquid has reached a predetermined level.

It is another object of the present invention to provide novel means for automatically indicating when the liquid level is within a preselected range, which range may be increased within space limitations, or decreased to an extremely minute value for accurately controlling the liquid level.

It is a more particular object of the present invention to provide contact elements disposable at different elevations and each adapted to close an electric circuit upon contact with a liquid surface, the circuits having different electrical wave characteristics for selectively actuating signal means to indicate closure of the respective circuits.

It is still another object of the present invention to provide a detecting device of the type described which is simple in construction and durable in operation, requiring no moving parts and being entirely electrically operated. Further, the detector construction of the present invention lends itself to quick and easy cleaning and sterilization, as is necessary in the processing of foods and other liquids requiring highly sanitary conditions.

It is yet another object of the present invention to provide a liquid level detecting device having the characteristics mentioned above, and including novel guard means adapted to insure a smooth, foam-free liquid surface area for contact with the detecting elements, which area accurately represents the true liquid surface level.

It is a further object of the present invention to provide a liquid level detecting device of the type described which is extremely economical to operate and maintain, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described and of which the scope will be indicated by the appended claims.

In the drawings:

Figure 1 is a schematic representation showing the electrical system of the detecting device of the present invention;

Fig. 2 is a longitudinal sectional view, partly broken away, showing a level-detecting probe constructed in accordance with the present invention;

Fig. 3 is a front elevational view showing the level detecting device of the present invention in position for use; and Fig. 4 is a view similar to Fig. 3, taken at right angles thereto, and showing the splash guard of the present invention removed from the probe.

Referring now more particularly to the drawings, and specifically to Figs. 2–4 thereof, the embodiment of the invention illustrated therein comprises a stand or support 10 having a substantially horizontal web 11 and depending legs 12 and 13 which are adapted to rest upon a tank cover 14 or other suitable surface spaced above a liquid 15. Extending vertically through the web 11, and preferably fixed therein by any suitable means, is a tube or sleeve 18 having its upper end cut away as at 19 to define pointers 20, 20.

Slidably mounted in the sleeve 18 is a probe, generally designated 21, which extends spacedly through the tank cover 14, at as 22, and which is surrounded by a resilient, preferably rubber ring 23. The ring 23 frictionally embraces the probe 21 and seats upon the upper surface of the tank cover 14 for holding the probe in any selected position of its vertical sliding movement.

As best seen in Fig. 2, the probe 21 includes an open ended tubular casing 24, preferably fabricated of suitable transparent material, such as glass or plastic. A cylindrical tube 25, which may be formed of paper or other appropriate material, is snugly received within the casing 24 and terminates short of the upper and lower casing ends 28 and 29, respectively. The tube 25 is graduated with markings or indicia 30 and defines a scale adapted to be read between the pointers 20, 20.

Inserted inwardly through and closing the upper casing end 28 is a plug 31, which may be fixed in the casing by suitable securing means, if so desired. The plug 31 has an enlarged outer portion adapted to overlie and abut the casing end 28, as clearly shown in Fig. 2. Another plug 32, of constant thickness along its length, is partially inserted into the lower casing end 29 to close the latter, and is preferably secured in the casing by any suitable means.

A pair of electrodes 33 and 34 are arranged in parallel spaced relation with respect to each other and both extend through and beyond the opposite ends of the plug 32. That is, the electrode 33 has its upper end 35 disposed interiorly of the casing 24 and its lower end 36 disposed exteriorly of the casing; and, similarly, the electrode 34 has its upper end 37 disposed interiorly of the casing and its lower end 38 disposed exteriorly of the casing. It will be observed that the lower ends 36 and 38 of the electrodes 33 and 34 are spaced vertically with respect to each other, so that the end 36 is at a slightly lower level or elevation than the end 38, all for a purpose to be described hereinafter.

A conducting member or rod 40 extends through and beyond the opposite ends of the plug 31, so that its lower end 41 is disposed interiorly of the casing 24 and its upper end 42 is disposed exteriorly of the casing. The rod 40 is electrically connected to the electrode 34 by a wire 43; and the electrode 33 is electrically connected to the rod 40 by a wire 44 and a rectifier 45 in series with the wire 44. Selenium-type rectifiers have proved satisfactory in operation and well adapted to meet the necessary space requirements. Any suitable electrical connector 48 is secured to the projecting end 42 of the rod 40 and provided with a wire 49 for connection to one side of a source of electrical energy.

Removably secured on the lower, projecting end of the plug 32 is a generally open ended tubular, splash guard or cap 50, which converges or tapers from its upper end 51 toward its lower end 52. A longitudinal cutout or slit 53 extends downwardly from the upper guard end 51 to a point spaced from the lower guard end 52, thereby affording a certain amount of resiliency to the upper splash guard portion for snugly, but removably embracing the plug 32. It will now be seen that the splash guard or cap 50 surrounds and encloses the lower, projecting ends of the electrodes 33 and 34, so that upon immersion of the lower probe end into the liquid 15, the surface of the latter rises within the splash guard to contact first the electrode 33 and then the electrode 34. All foam, unadulations or other surface disturbances of the liquid 15 will be eliminated from within the splash guard 50 to provide therein a smooth liquid surface area; and, the liquid surface may rise freely in the guard as air will escape or pass outwardly through the slit 53.

Mounted on the stand 11 is an electrical socket 54 which is connected in series in the line 49. A gas filled diode 55, preferably a neon glow bulb, is inserted in the socket 54 for series connection in the wire 49.

The electrical diagram of Fig. 1 shows a wire 58 electrically connected to the liquid or electrolyte 15 through the tank 57, the wires 49 and 58 being adapted for connection to opposite sides of an alternating current source 59. More particularly, the wires 49 and 58 are connected to the fixed polarity plug 60 which is adapted to be conformably received in the socket 61.

In operation, the plug 60 is properly inserted in the socket 61, and the probe 21 moved along the sleeve 18 to any desired position as determined by a reading of the scale 25 between the pointers 20, 20. The ring or collar 23 is then moved along the probe 21 into engagement with the upper surface of the tank cover 14 to hold the probe in the selected position. As the level of the liquid 15 rises, a quantity of the liquid will enter through the open lower end 52 of the splash guard 50 and make contact with the lower end 36 of the electrode 33. A circuit will then be closed through the wire 49, neon bulb 55, rectifier 45, wire 44, electrode 33, liquid 15, tank 57 and wire 58. As the rectifier 45 serves to cut out alternate half-cycles of the electrical waveform in the closed circuit, it is apparent that a pulsating direct current will pass through the neon glow bulb. As is well known, this will cause one electrode or terminal element (namely, the cathode) to glow.

Upon continued rising of the liquid 15, the liquid level will contact the lower end 38 of the electrode 34 to close a circuit through the wire 43 in parallel with the rectifier 45. Hence, upon contact of the electrode 34 with the liquid 15, the rectifier 45 will be bypassed to permit the passage of alternating current through the line 49, bulb 55, wire 43, electrode 34, liquid 15, tank 57 and wire 58. This will cause both electrodes or terminal elements (cathode and anode) of the neon bulb to glow.

In practice, the vertical spacing between the electrodes 33 and 34 may be as great as desired, within space limitations, to determine when the liquid level is within a particular range as defined by the vertical spacing between the electrode ends 36 and 38. A vertical spacing between the electrode ends 36 and 38 of as little as 1/64 inch has been found satisfactory in practice for accurately detecting and controlling the liquid level within such range.

While the above described operation calls for vertically adjusting the probe 21 and permitting the liquid level to rise, it will be appreciated that the probe may be moved vertically downward into contact with the liquid to produce the same electrical effects and the same action of the neon bulb or signal 55. Further, while a rectifier 45 has been described as changing the electrical wave form or wave characteristics when the circuit through the electrode 33 and liquid 15 is closed, it is appreciated that other suitable means may be employed for changing the wave characteristics; and signal means other than the neon bulb 55 may be employed which are responsive to the different wave characteristics, for indicating closure of the circuits through the electrodes 33 and 34.

From the foregoing, it is seen that the present invention provides a liquid level detecting device which requires no moving parts, and which is completely electrically operated. Further, the detecting device described herein is simple and durable in construction, and adapted to be quickly and easily cleaned and sterilized. For example, the splash guard 50 is detached from the probe for separate cleaning; and the connector 48 is removed from the rod 42 so that the casing and plugs 31 and 32 provide a sealed unit which may be cleaned and sterilized by conventional methods. It will now be understood that the present invention fully accomplishes its intended objects, and provides a device which is well adapted to meet practical conditions of use.

Although the present invention has been described in some detail by way of illustration and example for purposes of clarity of understanding, it is understood that certain changes and modifications may be made within the spirit of the invention and the scope of the appended claims.

We claim:

1. A liquid level detector comprising a pair of electrodes adapted for connection to a source of electrical energy having a predetermined waveform, one of said electrodes being disposable for contact with the surface of a liquid at one level to close a first circuit adapted to pass said predetermined waveform, the other of said electrodes being disposable for contact with said liquid surface at another level to close a second circuit, means connected in said second circuit for changing the waveform therein to a second predetermined waveform different from said first named waveform, and signal means characteristically responsive to said first and second named waveforms and connected to said electrodes for indicating closure of said first and second circuits.

2. A liquid level detector comprising a pair of electrodes connected in parallel and adapted for connection to a source of electrical energy, one of said electrodes being disposable for contact with the surface of a liquid at one level to close one parallel circuit through said liquid and said one electrode, the other of said electrodes being disposable for contact with said liquid surface at another level to close the other parallel circuit through said liquid and said other electrode, a rectifier in said one parallel circuit for passing only direct current, said other parallel circuit being capable of passing alternating current, and signal means adapted to indicate the presence of direct or alternating current connected in line with said pair of electrodes, whereby said signal means indicates closure of one or both of said parallel circuits.

3. A liquid level detector comprising a first electrode adapted for connection to a source of electrical energy and disposable in depending relation for contact with the surface of a liquid at a predetermined level, means for completing a circuit through said first electrode and liquid, rectifying means in series with said first electrode, a second electrode disposable in depending relation vertically spaced above said first named electrode for contact with said liquid surface at a higher predetermined level, said second electrode being connected to define a circuit in parallel with said rectifying means and first electrode to pass alternating current when said liquid surface is in contact with said second electrode, and signal means characteristically responsive to the passage of alternating and direct current interposed in line with said first and second electrodes to indicate closure of one or both of said parallel circuits, said signal means thus serving to indicate the level of said liquid surface.

4. A device according to claim 2, said signal means comprising a glow lamp having a pair of terminal elements, one of said elements glowing to indicate the presence of direct current and both of said elements glowing to indicate the presence of alternating current.

5. A liquid level detector comprising a pair of electrodes adapted for connection to a source of electrical wave energy and disposable in depending vertically spaced relation for contact with the surface of a liquid, means for completing a circuit through each of said electrodes upon contact of the latter with said liquid, means associated with the lower of said electrodes for changing the character of the electrical wave conducted thereto to one different from that in the upper of said electrodes, and signal means connected to said electrodes and responsive to different characters of the electrical waves for indicating closure of one or both of said circuits.

6. A liquid level detector according to claim 3, said signal means comprising a gas filled diode adapted to glow about one terminal during passage of direct current and about both terminals during passage of alternating current.

References Cited in the file of this patent

UNITED STATES PATENTS

| | | |
|---|---|---|
| 1,388,479 | Nickum | Aug. 23, 1921 |
| 1,504,978 | Robbins | Aug. 12, 1924 |
| 1,520,004 | Bloch | Dec. 23, 1924 |
| 1,555,802 | Huber | Sept. 29, 1925 |
| 1,796,919 | Brogger | Mar. 17, 1931 |
| 1,911,756 | Gunderson | May 30, 1933 |
| 2,053,938 | Barker | Sept. 8, 1936 |
| 2,159,531 | Polin | May 23, 1939 |